United States Patent [19]
Harshe et al.

[11] Patent Number: 5,821,007
[45] Date of Patent: Oct. 13, 1998

[54] POWER SOURCE FOR AN ELECTRICAL DEVICE

[75] Inventors: Girish R. Harshe, Wheeling; Darioush Keyvani, Chicago, both of Ill.

[73] Assignee: Motorola, Inc., Schaumburg, Ill.

[21] Appl. No.: 699,282

[22] Filed: Aug. 19, 1996

[51] Int. Cl.⁶ .................................................. H01M 16/00
[52] U.S. Cl. ................................. 429/9; 429/7; 361/434; 361/503; 361/525
[58] Field of Search ....................... 429/3, 7, 9; 361/434, 361/503, 523, 525

[56] References Cited

U.S. PATENT DOCUMENTS 5,113,085  5/1992  Schafer et al. ............................ 307/239
5,439,756  8/1995  Anani et al. ................................. 429/9
5,458,043  10/1995  Jensen et al. ................................. 89/8
5,587,250  12/1996  Thomas et al. ............................. 429/3
5,587,872  12/1996  Lian et al. ................................. 361/525

*Primary Examiner*—M. Nuzzolillo
*Attorney, Agent, or Firm*—Scott M. Garrett; Kelly A. Gardner

[57] ABSTRACT

A power source (10), preferably in the form of a battery pack, comprises a battery (14), an electrochemical capacitor (16), and a switch bridge (18). The capacitor increases the power delivery capability of the battery for periodic power bursts, increases it's life, and is electrically connected in parallel with the battery through a number of switches. The switch bridge is used to periodically reverse the orientation of the capacitor with respect to the battery to alleviate electrical stress on the capacitor.

9 Claims, 2 Drawing Sheets

POWER SOURCE FOR AN ELECTRICAL DEVICE

TECHNICAL FIELD

The inventions relates in general to power sources for portable electrical devices, and more particularly to hybrid power sources comprising a capacitor and a battery.

BACKGROUND

Portable electrical devices often require high power bursts to perform certain operations. For example, many recent communication systems require a series of short, high power bursts to achieve time division multiplexing, thus increasing the amount of users on a given frequency channel. The conventional power source for such portable devices has been a rechargeable battery pack. However, in many applications, the internal resistance of conventional battery packs has limited the performance of newer devices requiring such high power bursts. To assist conventional battery cells in delivering the required power, a new form of energy source is being developed. This new energy source is a hybrid between a conventional battery pack and a large value capacitor.

Among the different types of capacitor currently available, the electrochemical type offers the highest power delivery per unit volume. Many different chemical systems are being explored, and both polar and non-polar systems exist. In general, the capacitor is connected electrically in parallel with a rechargeable battery, which comprises one or more battery cells. The high power delivery capability of the capacitor is utilized when the host device requires high power bursts. During the non-peak time periods, power from the rechargeable battery is used to recharge the capacitor and provide power to the host device.

One drawback to the electrochemical capacitors is that a single cell cannot withstand much more voltage than the theoretical limit of about 1 volt applied to the capacitor. This has to do with the electrochemical nature of the device. Since most electrical devices operate at substantially higher voltage levels, the electrochemical capacitors must be stacked serially to distribute the higher voltage across several capacitors. A problem with such a serial connection of capacitors has arisen, however. Due to the sensitive nature of the components involved in manufacturing these devices, it has been difficult to achieve consistent capacitance values. As a result, capacitance varies from device to device, and when the capacitors are connected in series, often an imbalance results. When connected in series, the smallest value capacitor dictates the resultant capacitance of the stack. At the same time however, the smallest value capacitor also receives the largest division of voltage. Under some circumstances a high enough voltage may result, and stress the capacitor. This stress typically results in gassing and delamination of the electrolyte from the most negative electrode.

Another problem identified in current versions of electrochemical capacitors is leakage current. Since electrochemical capacitors operate as a chemical charge storage system, not as a dielectric charge storage system, the opportunity exists for a very small DC current to pass through an electrochemical capacitor. It has been determined that, at least in some electrochemical capacitors, the leakage current is a function of time. In fact, it has been observed that the leakage current tends to be stable for a period of time, then increases at some time to a higher level. If used in a hybrid energy source, excessive leakage current drains the battery of energy prematurely, and causes voltage imbalance.

Therefore there exists a need for a means to prevent delamination due to electrical stress of a an electrochemical capacitor, and for a means to prevent excessive leakage current through such a capacitor when used in a hybrid energy source.

DETAILED DESCRIPTION OF THE PREFERRED EMBODIMENT

Figure 1:
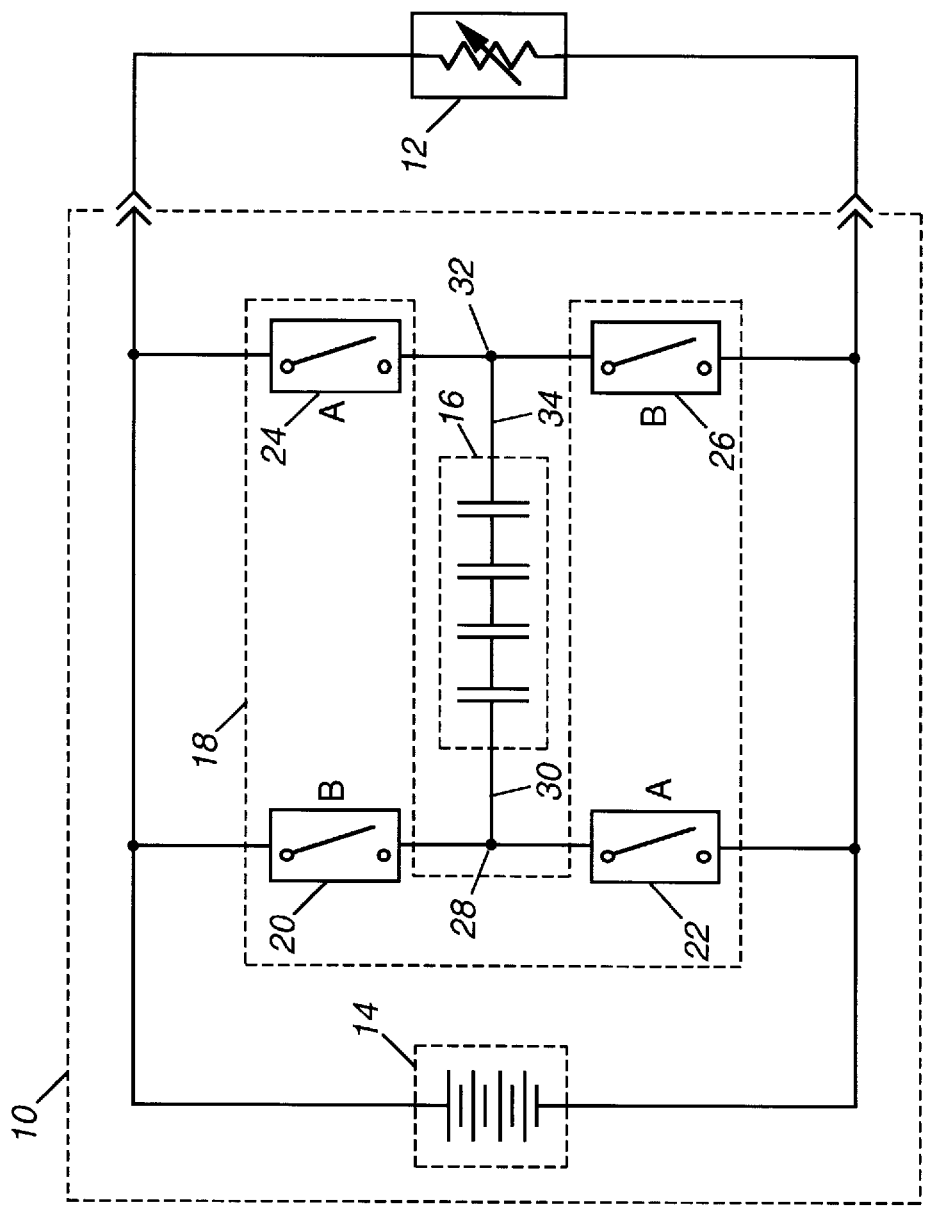
FIG. 1 is a schematic diagram of a power source in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic diagram of a power source 10 in accordance with the invention. The power source is coupled to a load 12, such as an electrical device having a periodic high power burst demand. The power source comprises three general components: a battery 14, a capacitor 16, and a means for electrically connecting the capacitor in parallel with the battery, such as switch bridge 18. The power source delivers a series of high current pulses to the load 12, with the high current pulses being drawn primarily from the electrochemical capacitor since the capacitor has a much lower internal DC resistance. In general, the battery is a rechargeable battery, and includes at least one battery cell. Typically there are several battery cells connected in series to provide a specific voltage output range for the device. The electrochemical capacitor includes at least one electrochemical capacitor cell, and will typically have several connected in series, depending on the operating voltage range of the battery. The capacitor has a first orientation and a second orientation, and is connected in parallel with the battery by the switch bridge in either orientation. An excellent example of such a capacitor can be found in U.S. patent application Ser. No. 08/547,821, now U.S. Pat. No. 5,587,872, entitled "ELECTROCHEMICAL CELL HAVING SYMMETRIC INORGANIC ELECTRODES" to Lian, et al.

In the preferred embodiment, the switch bridge comprises four switches grouped into two complementary pairs. A first pair is formed by switches 20 and 22, and a second pair by switches 24 and 26. In general, the first complementary pair of switches 20 and 22 has a midpoint node 28, to which a first terminal 30 of the capacitor is connected. The second complementary pair has a midpoint node 32, to which a second terminal 34 of the capacitor is connected. By complementary, it is meant that the switches are in complementary states, this is, if one is closed, the other is open.

Switches 22 and 24 are labeled A, and switches 20 and 26 are labeled B. To connect the capacitor in parallel with the battery in alternating orientation, either the A labeled switches are closed, or the B labeled switches are closed. By closing the A labeled switches, the capacitor is connected in a first orientation, then, by closing the B labeled switches, and opening the A labeled switches since they are complementary, the capacitor is connected in a second orientation.

By alternating the orientation of the capacitor with respect to the battery, the problems identified hereinabove are relieved. First, in the case of having a small valued capacitor cell in the electrochemical capacitor stack 16, it was found that the most negative electrode/electrolyte interface degraded. By alternating the orientation infrequently, the long term stress on the same electrode is moved to the other electrode of the cell. By infrequently alternating the capacitor orientation, the stress is shifted, and the life of the cell is significantly increased. It is believed that this alternating will enhance the life of all of the capacitor cells, but the smallest valued cell will generally dictate the life span of the capacitor 16. Second, the issue of increased leakage current is avoided. As mentioned hereinabove, it has been observed that, after a period of time, the DC leakage current through an electrochemical capacitor increases significantly. This period is often on the order of hours. By infrequently alternating the orientation of the capacitor, the increase in leakage current is avoided, thus conserving energy which may then go towards operation of the load 12.

Figure 2:
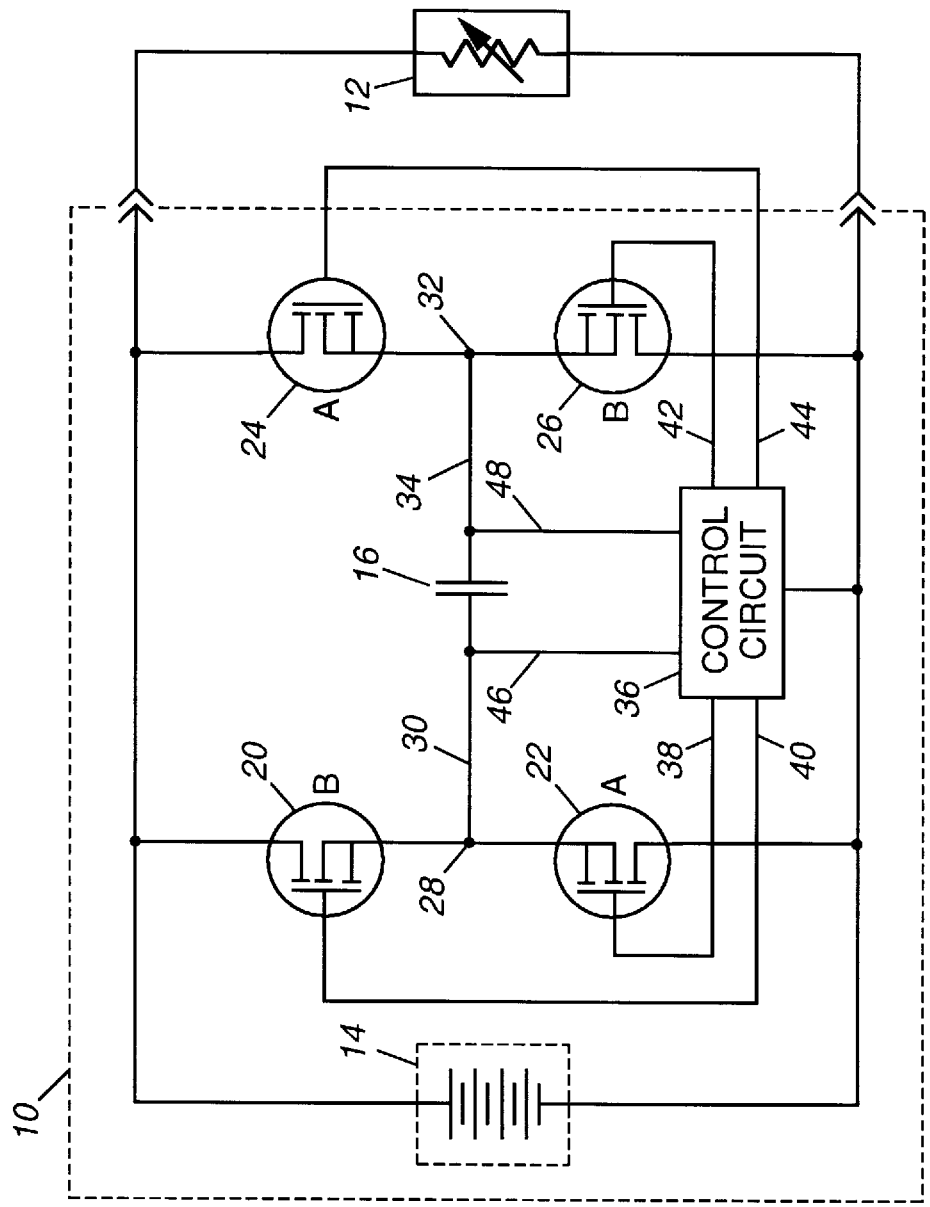
FIG. 2 is a schematic diagram of a power source in accordance with the invention.

Referring now to FIG. 2, there is illustrated therein a detailed schematic diagram of a power source in accordance with the invention. In the preferred embodiment, the power source is in the form of a battery pack. Typically a plastic housing is employed to package the battery 14, capacitor 16, and associated circuitry into a small portable package. This may be used to power, for example, cellular telephones, portable computers, and hand held power tools, to name but a few. In the preferred embodiment the switch bridge is a transistor switch bridge comprised of transistor switches, such as MOSFETs (metallic oxide semiconductor field effect transistor), such as shown in FIG. 2 for switches 20, 22, 24, and 26. MOSFETs offer very low DC resistance, and can be controlled with very little current. In one embodiment, switches 20 and 24 are P-channel MOSFETs, and switches 22 and 26 are N-channel MOSFETs. A control circuit 36 is connected to, and controls each MOSFET. If P-channel and N-channel pairs are used, as described, then the control lines from the control circuit to the transistors may be shared. That is, the individual control lines to switches 20 and 24, may also be connected to switches 22 and 26, respectively. This is because P-channel and N-channel devices are opened and closed by opposite voltages. A low voltage fed to switch 22 will cause it to be open, while the same voltage applied to switch 20 will cause it to be closed.

To achieve connection of the capacitor 16 into the circuit, control lines 38 and 40 would then be at either at one voltage state, either a "high" or "low" as referred to in the art, and control lines 42 and 44 would have the opposite voltage state. This would cause the desired switch states to connect the capacitor in a first orientation. By inverting the voltage on the control lines, the switch states will change, thus connecting the capacitor in a second orientation in parallel with the battery. This type of switching of an element is known in the art as commutating. The switch bridge is used to periodically commutate the capacitor with respect to the battery. It is contemplated that the control circuit detect when the load, or electrical device to be powered, is turned on and off. The control circuit could detect the change in state from off to on, and then change the orientation of the capacitor so as to provide the benefit described hereinabove. The detecting may be performed by a variety of conventional means such as current detection, or receiving a "power up" signal from the electrical device. It is thought that the period of time between power up events is sufficient to achieve this benefit, although it is also contemplated that a timing means may be employed to ensure that the capacitor orientation is changed within some predetermined time period.

In an alternate embodiment, the control lines 38, 40, 42, and 44 are driven separately. In this way the state of each switch may be controlled individually. This would allow the control circuit to totally disconnect the capacitor from the battery when the load is not connected, thus completely eliminating any leakage current under idle conditions. Furthermore, the control circuit may comprise connections 46 and 48 to the capacitor so that it may discharge the capacitor before reversing it's orientation with the switch bridge. By doing so, high peak current can be reduced when changing the switch bridge state from one orientation to the next.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A power source for an electrical device, comprising:
   a battery;
   an electrochemical capacitor having an orientation having a first orientation and a second orientation; and
   means for electrically connecting said electrochemical capacitor in parallel with said battery alternately in either said first orientation or said second orientation.

2. A power source as defined by claim 1, wherein said means for electrically connecting comprises a transistor switch bridge.

3. A power source as defined by claim 1, wherein said power source delivers a series of high current pulses to a load, said high current pulses being drawn primarily from said electrochemical capacitor.

4. a power source as defined by claim 1, wherein said means for electrically connecting changes said orientation of said electrochemical capacitor when said electrical device is turned on.

5. A method of reducing leakage current through an electrochemical capacitor used in a power source for powering an electrical device, said electrochemical capacitor connected in parallel with a battery in either a first orientation or a second orientation, said method comprising the steps of:

providing a switch bridge for connecting said electrochemical capacitor in parallel with said battery;

detecting a change in state of said electrical device from off to on; and commutating said electrochemical capacitor after said step of detecting to change from said first orientation to said second orientation.

6. A method of reducing leakage current as defined by claim 5, wherein said step of providing a switch bridge is performed by providing a transistor bridge, said step of commutating comprises inverting a bias voltage level applied to said transistor bridge.

7. A battery pack for powering an electrical device, comprising:

a battery;

an electrochemical capacitor having a first orientation and a second orientation; and switch bridge for electrically connecting said electrochemical capacitor in parallel with said battery and commutating said electrochemical capacitor between said first orientation and said second orientation.

8. A battery pack as defined by claim 7, wherein said battery pack delivers a series of high current pulses to a load, said high current pulses being drawn primarily from said electrochemical capacitor.

9. A battery pack as defined by claim 7, wherein said switch bridge commutates said electrochemical capacitor when said electrical device is turned on.

* * * * *